INVENTORS
LEWIS R. DALRYMPLE
BY & GEORGE H. LISTER

ATTORNEYS

United States Patent Office 3,159,749
Patented Dec. 1, 1964

3,159,749
PHOTOSENSITIVE LINEAR MEASUREMENT SYSTEM
Lewis R. Dalrymple, Conneaut, and George H. Lister, Cleveland, Ohio, assignors to The Euclid Electric & Manufacturing Co., Madison, Ohio, a corporation of Ohio
Filed Jan. 2, 1964, Ser. No. 335,322
18 Claims. (Cl. 250—223)

This invention relates to a measuring system especially designed to measure an article moving along a conveyance path and, more particularly, to a measuring system which is operable to measure an end-to-end dimension (length) along the direction of conveyance of an article moving along a conveyance path with or without necessarily contacting said article.

A primary object of the present invention is the provision of a new and novel measuring system for measuring the length or similar end-to-end dimension of a moving article and is especially designed, though not limited to measuring the dimension (length) of a hot steel bar or slab which is being moved along a rolling mill or other conveyance path, said dimension being along the direction of conveyance and where the measuring system preferably does not come into direct contact with said bar or slab.

Another object of the present invention is the provision of a new and novel measuring system especially designed for remotely measuring the dimension (length) of an article such as a hot metallic bar or slab moving along a conveyance path, said dimension being along the direction of conveyance and which is operable to provide an exact measurement thereof independent of changes occurring in the rate of conveyance of said article along said path.

Still another object of the present invention is the provision of a new and novel measuring system especially designed to measure an end-to-end or other similar dimension of an article moving along a conveyance path, said dimension being along the path of conveyance and wherein the measuring system does not come into direct contact with said article, and which system is operable to provide an exact measurement of various lengths of articles moving continuously along said path.

Another object of the present invention is the provision of a new and novel measuring system especially designed to provide an end-to-end or other similar dimensional measurement of an article moving along a conveyance path wherein the measuring apparatus of said system does not come into contact with the article moving therealong, and which system includes detector means operable by the leading end of an irradiant bar or slab to sense the conveyance thereof along said path and to provide a first binary signal representative of a primary portion of the length of said article beginning at said leading end to a point thereon intermediate the latter end and the trailing end, detector means actuatable by the leading and trailing ends of said irradiant article effective to provide binary dividend and divisor signals and ratio means for comparing the said dividend and divisor signals to provide a quotient signal representative of the remaining length of said article.

Still another object of the present invention is the provision of a new and novel measuring system as is defined in the last preceding object, and wherein said system includes means for totalizing the first signal and the quotient signal to provide a binary signal representing the exact end-to-end dimension of said article.

Another object of the present invention is the provision of a new and novel measuring system especially designed to provide an end-to-end or other similar dimensional measurement of an article moving along a conveyance path along the direction of said conveyance and wherein the measuring apparatus or system does not come into contact with the article moving therealong, and which system includes signal means actuatable by the leading and trailing ends of the article moving along the conveyance path so as to provide a signal having predetermined time characteristics representing the interval between the actuation of said signal means by said leading and trailing ends, sensor means disposed at predetermined spaced intervals along said path and successively operable by the leading end of said article as it is conveyed therepast effective to provide a signal representative of the spacing between the actuated sensor means and the next adjacent sensor means previously actuated by said leading end, said latter signal having identical time characteristics with respect to the first mentioned signal, and ratio means for dividing the magnitude of the first signal by the magnitude of the second signal to result in a quotient signal which is representative of the exact length of the said article.

Another object of the present invention is to provide a new and novel measuring system as is defined in the last preceding object and wherein the sensor means are disposed in pairs at predetermined spaced intervals, and which are operable by the leading end of the article moving along the conveyance path to provide a plurality of divisor signals each having identical predetermined time characteristics, means for determining an average of said divisor signals and means for dividing said average of said divisor signals into said first signal to result in said quotient signal.

Still another object of the present invention is the provision of a new and novel measuring system especially designed to provide an end-to-end dimensional measurement of an article such as a hot metallic bar or slab moving along a conveyance path and wherein the measuring system includes a plurality of primary sensor means disposed at predetermined spaced intervals along the conveyance path being operable to provide a primary signal defining a dimensional measurement of a primary portion of the length of said article along the direction of conveyance, and vernier sensor means for providing a vernier signal defining a measurement of the remaining portion of said article, said primary and vernier signals being combined to provide an exact end-to-end measurement of the said article.

Another object of the present invention is the provision of a new and novel measuring system as is described in the last preceding object, and wherein the vernier measurement of the length of the remaining portion of said article is accomplished by a ratio computation which is combined with the measurement defining the primary portion and which is effective to provide an exact measurement of the overall end-to-end dimension of said article.

Additional objects and advantages of the measuring system of the present invention will be apparent to one skilled in the art to which it pertains and upon reference to the several embodiments thereof which are disclosed herein and illustrated in the accompanying drawings forming a part of this specification, and wherein.

Briefly, the measuring system of the present invention is operable to provide an exact measurement of the dimension of an article moving along a conveyance path, for example the end-to-end measurement (length) of the article, in the direction of conveyance wherein it is not desirable for the measuring system to come into direct contact with said article. The measuring system of the present invention has particular utility, though it is not limited thereto for measuring the length of a hot irradiant metallic slab or bar where the temperature of said metallic material prevents the measuring system from directly contacting said material. This is accomplished, by providing a plurality of detectors which are responsive to the irradiant article moving along the path, wherein a plurality of said detectors are located in predetermined but not necessarily equally spaced relation to each other to provide a binary computation of a primary portion of the length of said article beginning at the leading end of the article and extending rearwardly therefrom to a predetermined point therealong short of the trailing end of said article, said system also having a plurality of detectors located in predetermined spaced relation to each other, and which are cooperatively operable to provide a vernier binary computation of the remaining length of said article from said intermediate point to the trailing end thereof, said primary and vernier binary computations being thereafter combined to provide an exact overall end-to-end measurement of said article.

Figure 1:
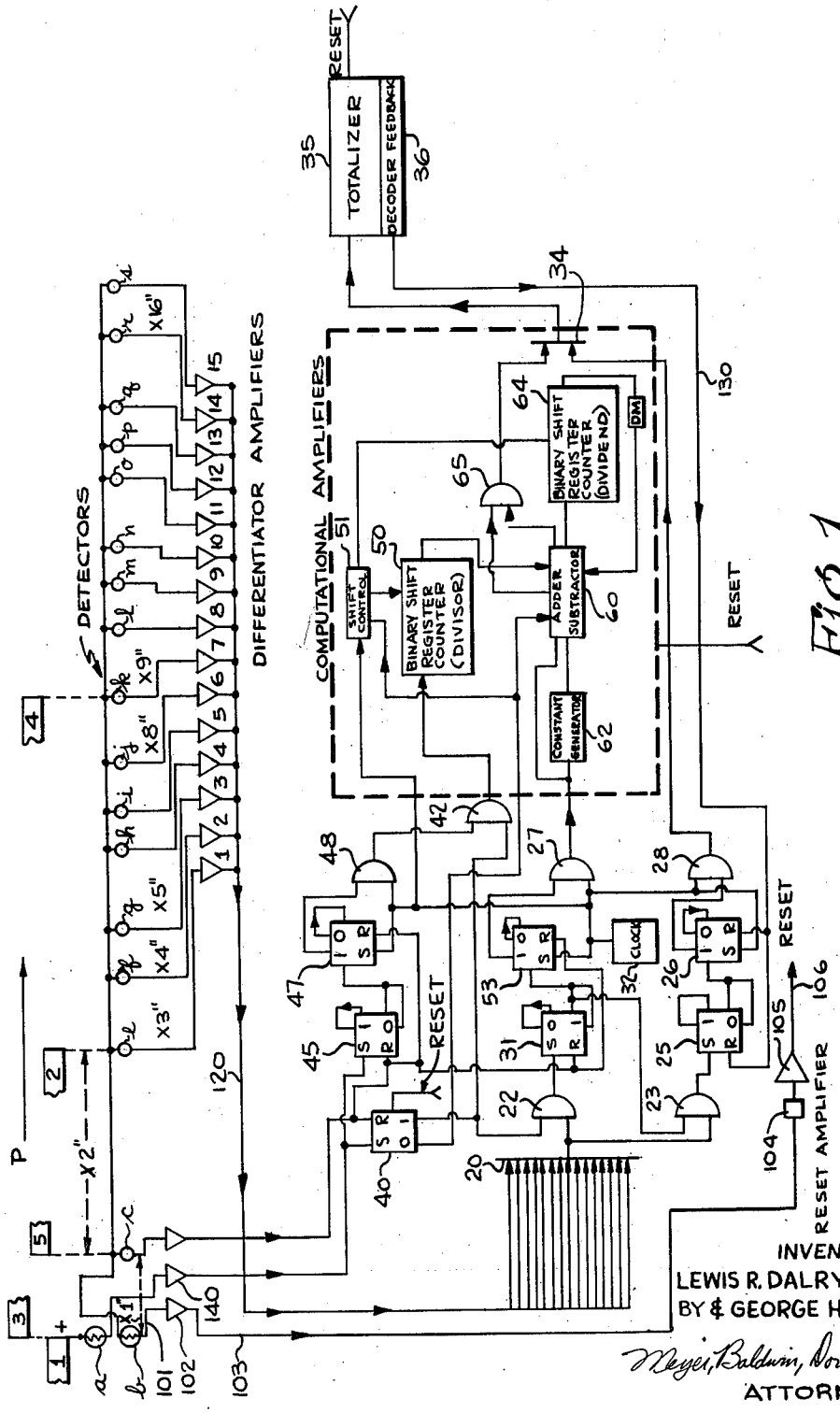
FIG. 1 is a schematic circuit diagram of a first embodiment of the measuring system embodying the concepts of the present invention.

Referring now to the drawings and with particular reference directed to FIG. 1, a preferred embodiment of the instant measurement system is herein shown, and merely for purposes of the present disclosure, it is seen to be incorporated for use with a conventional conveyor system such as the type usually provided in rolling mill installations or the like, for example, a plurality of conveyor rolls disposed in spaced relation to each other to define a conveyance path P for moving and supporting a hot irradiant metallic bar or slab therealong.

Spaced along the conveyance path P and closely adjacent thereto are a plurality of detectors, identified herein as being of the infra-red type, operable to sense the presence of an irradiant bar or slab moving along the conveyance path and to initiate a signal to effect the measurement of said bar or slab by the instant measuring system.

As will later be apparent, the detectors may also, for example, be of the photocell or photoconductive type or the like capable of providing a signal in response to the arrival or departure of the bar or slab at a preselected point on the aforesaid conveyance path. Three of said detectors, as identified by the reference characters $a$, $b$ and $c$, are seen to be disposed closely adjacent the input or left end of the conveyance path P, the detectors $a$ and $b$ being located at the same position along said path, whereas detector $c$ is located at a predetermined distance $x_1$ from said detectors $a$ and $b$ in the direction of the intended conveyance of the bar or slab.

The remaining detectors which, in the instant assembly, are fifteen (15) in number, merely for purposes of the instant disclosure, are identified by the reference characters $e-s$ inclusive, and are likewise disposed in preselected but not necessarily equally spaced relation to each other along the conveyance path.

Upon initially installing the instant measuring system along the conveyance path P, the distance $x_1$ between the detectors $a$, $b$ and $c$ is a known value and is made equal to or greater than the known distance between detector $c$ and detector $e$.

Likewise, the aforesaid distance $x_1$ between detectors $a$, $b$ and $c$ is equal to or greater than the known distance between each of the detectors $e-s$ identified herein respectively by the reference characters "$x_3$, $x_4$, $x_5$ . . . $x_{16}$."

In the installation of measuring system as is disclosed in FIG. 1, each of the bars or slabs is expected to have a minimum length and consequently it is possible and usually desirable, in order to minimize the number of detectors and computating components associated therewith as will be hereinafter more fully understood, to space the detector $e$ at a known distance $x_2$ from detector $c$ along the path P in the direction of conveyance, which distance $x_2$ is equal to or less than the expected minimum length of the bar or slab.

Therefore, in the embodiment of system herein disclosed, the distance $x_2$ is seen to be greater than the distance $x_1$, but only because the expected minimum length of the metallic slab or bar to be measured thereby is to have a length corresponding to or greater than the distance $x_2$.

As will later be explained, the detector $e$ when actuated initiates a signal to the computational components associated therewith which is representative of said distance $x_2$.

The remaining detectors $e-s$ are each disposed in spaced relation to each other as aforesaid by a known distance as represented at "$x_3$, $x_4$, $x_5$ . . . $x_{16}$," each of said distances being equal to or less than the distance $x_1$ but not necessarily of equal spacing with respect to each other.

When an irradiant slab or bar is moved along the conveyance path P its leading end first activates detector $b$ to initiate a reset signal which in the present instance is a positive transition pulse and which is then utilized to reset the measurement system and to thereby condition the same to determine the length of the instant bar.

For this purpose, the detector $b$ is seen to be connected by conductor 101 to a detector amplifier 102 of conventional design, the output of said amplifier being connected by conductor 103 to the input of a delay multivibrator 104. The multivibrator 104 is of the type commonly referred to as a monostable multivibrator which, as is well known, has a stable state of operation and a quasi-stable state.

The detector amplifier 102 is responsive to the voltage pulse from detector $b$ to provide a corresponding pulse signal preferably of approximately 20 microseconds' duration which is applied through conductor 103 to the input of the multivibrator 104.

The multivibrator 104 then switches to its quasi-stable state thus producing a signal at its output which is amplified by amplifier 105 likewise of conventional design, and which amplified signal is then applied through conductor 106 to provide a console signal effective to reset the several components of the system as will hereinafter be more readily understood.

As the bar or slab continues to be moved along the conveyance path P, the measurement of what will also be hereinafter defined as the primary portion of its length is initially determined. This primary portion is the portion between its leading end and a point thereon rearwardly from the leading end but short of the trailing end of said article.

To accomplish this, each of the detectors $e-s$ which may also be hereinafter identified as the coarse increment detectors, is seen to be individually connected to a correspondingly numbered differentiator amplifier (1-15) which may be of any conventional design and which comprises an amplifier, differentiator and pulse shaper wherein a pulse of predetermined amplitude and width is produced when the product of the detector output rate of change and amplitude exceeds a predetermined value.

The output of each amplifier (1-15) is separately connected through multistrand cable 120 to the input of a conventional OR gate 20.

As is well known, an OR gate is a circuit which transmits an output binary "one" signal when at least one of two binary "one" inputs is applied thereto, said output signal being either of the same or opposite polarity as said input.

An output signal from any of said differentiator amplifiers (1-15) when applied to OR gate 20 is effective to provide an output binary "one" signal from said gate.

The output signal of OR gate 20 is then applied to the input of a NAND gate 22, and likewise to the input of a second NAND gate 23 connected in parallel therewith.

Each of the NAND gates 22 and 23 is a conventional gate circuit which has an operational characteristic such that when a signal representing binary "one" is placed on each of the input lines of the gate circuit a binary "zero" is realized on its output line, and wherein placing a binary "zero" on any one input line will produce a binary "one" on the output line. Said circuit therefore "nands" ones and "nors" zeros. The N in NAND as will be understood indicates that the output signal is in an inverted form with respect to the input signal.

The output of NAND gate 23 connected to the input of a conventional bistable multivibrator known in the art as a flip-flop circuit as indicated at 25, the output of said multivibrator 25, in turn, connecting to the input of a similar multivibrator or flip-flop circuit 26.

Each of the multivibrator or flip-flop circuits 25 and 26 is a circuit which may include two transistor stages or the equivalent, one of which conducts while the other is cut off. One condition is normally defined as the "on" condition and the remaining condition being called the "off" condition.

AND gate 28 connects serially with the output of multivibrator 26 and the output of AND gate 28 comprises one input to an OR gate 34. As will later be described in greater detail the second input to AND gate 28 defines the clock pulses from clock 32.

As is well known, an AND gate is a circuit which has at least two inputs and one output. If both inputs are binary "one" the output will also be binary "one." Under all other conditions the output will be binary "zero."

The output of OR gate 34, in turn, is connected to a binary counter or totalizer 35 of conventional design, in which distinct clock pulses from clock 32 gated by the actuation of any or all of the coarse detectors 1–15 are accumulated to represent the measurement of the primary portion of the hot bar or slab.

When the slab or bar is conveyed to a position such that its leading end actuates the detector $e$, its differentiator amplifier 1 connected thereto is responsively energized to provide a positive going transition pulse of approximately 20 microseconds' duration to provide an input binary "one" signal to OR gate 20. Said pulse is passed by OR gate 20 to provide a binary "one" input to NAND gate 23.

A multivibrator 31, which is also a bistable type of multivibrator or flip-flop circuit, is seen to have its input connected to the output of NAND gate 22 and its output connected to the input of NAND gate 23 to thereby define the remaining input thereto. As will be hereinafter described, at this instant multivibrator 31 has previously been actuated to its reset condition to provide a binary "one" signal to the input of NAND gate 23.

Consequently, when the signal pulse from OR gate 20 representing a binary "one" signal is applied to NAND gate 23, the signal from multivibrator 31 already being applied thereto, said NAND gate 23 is actuated to provide a binary "zero" signal as an output thereto.

Said binary "zero" signal is effective to set flip-flop 25 which, in turn, primes flip-flop 26.

A source of pulse signals recurring at a constant repetitive rate such as indicated by clock 32, preferably generating 10,000 pulses per second, is seen to be connected to flip-flop 26 and likewise to AND gate 28 to define, as aforesaid, the remaining input to the latter.

When the flip-flop 26 is primed by flip-flop 25, the next pulse from clock 32 sets flip-flop 26 whereby the latter provides a binary "one" output to AND gate 28.

Thereafter, the next pulse from clock 32 defines the second binary "one" input to AND gate 28 whereby said gate then passes the clock pulses each representing a binary "one" signal to the OR gate 34, through said gate to the binary accumulator or totalizer 35.

The totalizer 35 may be of conventional design, being capable of receiving said pulse signals and storing the same, said pulses, as aforesaid, occurring at a repetitive rate of 10,000 per second and representing a binary "one" signal and the interval between each pulse representing a binary "zero" signal.

Provided at this instant that the bar or slab is sufficiently long so that its trailing end does not actuate detector "$a$," the number of clock pulses received by the totalizer 35 is representative of the distance $x_2$ between detectors $c$ and $e$ which, as aforesaid, is the expected minimum length of said bar or slab.

For example, assuming that the expected minimum length of said bar is to be 30 feet and further assuming that one pulse from the clock 32 is precisely selected to equal .01 foot, 3,000 pulses are transmitted to the totalizer 35 to represent the distance $x_2$ when the leading end of the bar or slab actuates the detector $e$.

The totalizer 35 includes a conventional decade-type, binary-decimal decoder feedback unit 36 which is operable to sense the receipt by said totalizer of said precisely determined number of pulses (3,000 in the present illustration) representing the distance $x_2$, decode the same into its decimal equivalent and to likewise initiate a feedback signal which is then applied through conductor 130 to the flip-flops 25 and 26 effective to reset the same effective to stop the pulse count from clock 32 at precisely 3,000 pulses and to await the actuation of the next coarse detector $f$.

As the bar or slab continues to move along the conveyance path P, its leading end successively actuates one or more of the remaining coarse detectors ($f$, $g$, $h$ . . . etc.) after which in each instance a predetermined number of clock pulses from clock source 32 corresponding to the actual distance between said adjacent detectors is transmitted to the totalizer 35, said pulse number or group representing the distance traversed between the last previous detector to the actuated detector.

For example, as coarse detector $f$ is actuated a predetermined number of pulses representing distance $x_3$ is transmitted to the totalizer 35. Inasmuch as distance $x_3$ may be greater or less than the distance $x_2$, the number of clock pulses representing distance $x_3$ will likewise be correspondingly different.

In like manner, when each coarse detector ($g$, $h$ . . . $s$) is thereafter actuated a predetermined number of pulses from clock source 32, representing respectively distance ($x_4$, $x_5$ . . . $x_{16}$), is transmitted to the totalizer 35.

The totalizer 35, upon receiving each successive pulse group representing distances ($x_3$, $x_4$, $x_5$ . . . $x_{16}$), adds said pulse group to the pulse group or groups previously received.

The decade-type decoder unit 36 is preset, as will be understood, so that upon the totalizer 35 receiving each additional pulse group, it initiates a feedback signal that is applied to the flip-flops 25 and 26 effective to reset the same to await the next signal from AND gate 23 signifying the actuation of the next coarse detector.

In actual practice, because of the operational characteristics of the components in the detectors and amplifiers, it may be necessary to adjust the decoder unit 36 to add or subtract one or several pulses from the assumed number to provide a precise number of pulses (electrical distance) which will then correspond to the exact physical dimension representing distance $x_2$ and, as will hereinafter be apparent, the distance between any succeeding detectors.

In this manner therefore, flip-flops 25 and 26 act to synchronize the transmission of pulses by clock 32 to the accumulator 35 with the actuation of a coarse detector ($e$–$s$) by the leading end of the slab or bar.

This serial accumulation of binary pulse groups representing the length of the primary portion of the slab or bar continues until the trailing end of the bar or slab drops off or passes the detector "a" effective to actuate said detector.

When this occurs, a ratio computation of the length of the vernier or remaining portion of the bar is initiated which will now be described.

As seen in FIG. 1, detector "a' is connected to a detector amplifier 140 which is the complement of amplifier 102 inasmuch as it is operated by the trailing end of the bar and which, in turn, receives a signal from detector "a," amplifies and shapes said signal and then applies said signal to a flip-flop 40 which is similar to flip-flop 25 whereby to set said flip-flop 40 and provide a binary "one" output signal therefrom.

Said binary "one" output signal is then applied to the input of an AND gate 42.

Said amplified signal from amplifier 140 is also applied to a similar flip-flop circuit 45 which is connected in parallel with flip-flop 40 effective to set said flip-flop 45, whereby a binary "zero" output signal from flip-flop 45 is applied to a similar flip-flop 47 connected serially therewith and which is effective to prime the latter.

Clock 32 is seen to be connected to flip-flop 47 and when the latter is primed by the output signal from flip-flop 45, the next clock pulse sets said flip-flop 47 whereby to provide a binary "one" output signal therefrom which is then applied to and defines one input of a conventional AND gate as identified at 48.

Clock 32 is likewise connected to said AND gate 48 to define a second input thereto whereby each pulse defines a binary "one" signal to said gate. As a result with a binary "one" signal applied to each input, a binary one signal is generated as the output signal of said gate 48 which is then applied to and defines the second input to AND gate 42. Said output signal from gate 42 as will be understood is at the same recurrence rate as the pulses from clock 32.

AND gate 42 is connected in serial fashion to the input of a binary shift register counter 50 (Divisor) which can be of conventional design and which, as will be understood, is capable of receiving and storing the binary pulse information received from said AND gate 42.

A Shift Control Unit 51 of conventional design is seen to be connected between the output of clock 32 and the "Divisior" register 50 and is actuated by said clock to control the addition of and accumulation of the binary pulse information received from AND gate 42 in a manner as is understood in the art.

This pulse information, since orginating from clock 32 thus has the same recurrence rate or time characteristics as the pulse information which represents the length of the primary portion of the irradiant bar.

As said bar continues to move along the conveyance path P, said clock pulse information likewise continues to be applied to the "Divisor" register 50, said information also being hereinafter referred to as the binary divisor count information for the vernier portion of the bar.

When the trailing end of the bar actuates detector "a" in the manner as just described, so as to set flip-flop 40, a binary "one" output signal from said flip-flop is also applied to and defines one input to the aforementioned NAND gate 22, the other input to said gate connecting with the output of OR gate 20. At this instant the leading end of the bar is between coarse detectors such as, for example, between detectors j and k.

Thereafter, when the leading end of the bar actuates the next coarse detector (f, g . . . s) for example coarse detector k, which is shown to be at position 4 for said bar, the signal generated by its differentiator amplifier 7 passes thorugh OR gate 20 and defines the remaining binary "one" input to said NAND gate 22.

When this occurs, a binary "zero" output signal is generated by said NAND gate 22 and applied to the flip-flop 31 effective to set the same and provide a binary "zero" signal to the input of NAND gate 23.

As a result, NAND gate 23 is disabled whereby the flip-flops 25 and 26 remain in their "reset" condition so as to prevent any further transmission of clock pulses from clock 32 through AND gate 28 and OR gate 34 thus terminating the measuring cycle for the coarse or primary part of the bar.

A conventional flip-flop 53, similar to flip-flop 25, has its input connected to the output of flip-flop 31, and when the latter is actuated to its "set" condition, a binary "one" output signal is generated by said flip-flop 53 and applied to and defines one input to an AND gate 27.

Thereafter, the next clock pulse from clock 32, each likewise representing a binary "one" signal, and defining the other input to AND gate 27 provides a binary "one" output pulse signal from said gate which output signal occurs at the same repetitive rate as said clock pulses thus having the same time characteristics as the latter.

Said output pulse signal from AND gate 27 is then applied to the input of an Adder-Subtractor Logic Unit as identified at 60 which unit, as will be hereinafter realized, is in its add mode. The Adder-Subtractor Logic Unit 60 may be of any conventional design capable of performing binary multiplication and division by addition and subtraction respectively, as will be understood.

The Adder-Subtractor Unit 60, while in its add mode, receives the clock pulses from AND gate 27 to thereby initiate the accumulation of a dividend count of pulse information.

A Constant Generator 62 is connected between AND gate 27 and the Adder-Subtractor Unit 60 and applies a suitable binary constant representing a predetermined number of clock pulses to the Adder-Subtractor Unit 60 which constant is multiplied by binary addition with the aforesaid dividend pulse information so as to guarantee that the dividend pulse information will be larger than the divisor pulse information. The Constant Generator 62 may be of any conventional binary generator design and is actuated by the first pulse passed by AND gate 27 to apply said binary constant to the Adder-Subtractor Unit 60 at the same time the dividend pulse information is applied to said Unit 60.

The DM is the conventional symbol for a suitable delay multivibrator and, as shown in FIG. 1, is connected between the Adder-Subtractor Unit 60 and the Dividend Register 64 to provide the synchronization usually necessary in serial accumulation as will be understood between said connected components to indicate pulse carry indication to the Adder-Subtractor Unit which has already been accumulated in the Dividend Register.

This pulse information which represents the dividend pulse information is then passed to a suitable binary shift register counter (Dividend) or accumulator 64 of conventional design wherein said information is temporarily stored.

Once the divisor and dividend pulse information is initiated, said information continues to be accumulated in the respective "Divisor" and "Dividend" registers 50 and 64 in the manner just described until the trailing end of the irradiant bar passes and actuates the detector "c" which is shown at position 5 for said bar.

As will be understood, the number of counts or pulses received by the divisor register 50 from the constant rate source or clock 32 will be a function of the speed of the articles traveling between sensors "a" and "c." Also the number of pulses or counts received by the dividend register 64, from the same constant rate source, will be a function of the speed of the bar traveling between the first coarse sensor "seeing" the bar after the trailing edge passes sensor "a" and sensor "c." It will also be a function of the length of the bar in the vernier section after the first coarse sensor is actuated after the trailing end leaves sensor "a."

For any given length of bar in the vernier section the ratio of pulses received by the divisor register 50 to those received by the dividend register 64 will be the same regardless of the speed of travel of the bar. Furthermore, acceleration or deceleration of the bar in the vernier section will have but a very slight effect on the accuracy of measurement of that portion of the bar being measured.

When the trailing end of the bar reaches position #5, a signal from said actuated detector c is applied to amplifier 150 which is similar to amplifier 102 and 140, wherein said signal is amplified and then applied to the flip-flop circuit 40 effective to "reset" the same.

As a result, a binary "one" output signal from said flip-flop circuit 40 is applied to the Adder-Subtractor Logic Unit 60 effective to switch said Unit to its "subtract" mode. Likewise, said output signal from flip-flop circuit 40 is applied to the Shift Control Unit 51 whereby it signals the Divisor and Dividend Registers 50 and 64 to shift the preloaded or accumulated divisor and dividend pulse information to said Adder-Subtractor Unit 60 wherein said dividend information is divided by the divisor information by binary subtraction to result in a ratio computation of the length of the vernier portion of the bar.

As will be understood, in the process of binary division by subtraction, recirculation and borrowing take place. This function may be utilized as is done in the instant system to enable a serial output to be directly applied to the Totalizer 35 representing the length of the vernier portion of the bar. For example, assuming that one clock pulse is set to equal .01 foot as is aforementioned, and with the proper pulse rate established, as will be readily understood, between the pulse rate at which the Divisor Register 50 is loaded with divisor pulse information from the clock 32, and the binary constant from Constant Generator 62 with which the dividend pulse information is multiplied, and further with the Shift Control Unit 51 being connected to the clock 32 so as to shift the divided and divisor pulse information to said Unit 60 per each clock pulse, a borrow pulse per each shift cycle during said (divide) subtract mode is provided which represents in its decimal equivalent .01 foot. Thus, by shifting and recirculation per clock pulse, the borrow pulse information resulting from this ratio or divide computation represents, in hundredths of a foot, the exact length of the vernier portion of the bar or that portion of the bar extending rearwardly from detector "c" at the instant the next coarse detector is actuated by the leading end of the bar immediately subsequent to the actuation of detector b by the trailing end of the bar.

This borrow pulse information per each shift cycle is applied to and defines one input to an AND gate 65, the remaining input to said gate likewise connecting with the Adder-Subtractor Logic Unit 60 so as to indicate the presence of said borrow condition. With each input to said gate 65 representing a binary "one" signal, the output of said gate likewise represents a binary "one" signal which, in essence, represents the borrow pulse per shift cycle.

This pulse information output from said AND gate 65 is then applied through the aforesaid OR gate 34 to the Totalizer Unit 35 wherein it is added to the pulse information previously accumulated in said Unit 35 representing the length of the primary or coarse portion of the bar.

When the divide (subtract) cycle is complete, a "zero" signal applied to AND gate 65 indicates a zero borrow condition or the end of the Divider cycle which thereby inhibits said gate 65.

At this time the pulse information from AND gate 65 represents the length of the vernier portion of the bar.

The total pulse information received in the Totalizer 35 may then be decoded in the Decoder-Feedback Unit 36 to its decimal equivalent, said Unit having suitable read-out or memory devices such as printers or the like whereby the decimal value may be permanently and/or semi-permanently indicated.

The measuring system remains in this operational mode until the next bar is moved along the conveyance path whereby its leading end actuates detector b at position 1 to thereby provide a console reset signal which is then applied through conductor 106 being thus effective to reset the several components thereof as indicated including flip flop 40 and the computational amplifiers 50, 62 and 64 to thus ready the system for its next subsequent measuring operation.

The logic components herein referred to as the reset amplifier 104, differentiator amplifiers 1 to 15, totalizer 35, decoder feedback 36, binary shift (divisor) register 50, adder-subtractor logic unit 60, constant generator 62, binary shift (dividend) register 64, and shift control 51 are fully illustrated and described in their respective conventional circuit configurations in the following literature and hence need not be further described herein.

(1) Counters and Registers by Control Logic, Inc. Applications Brochute No. 1, August 1962.

(2) 100 kc. Digital Circuits by Control Logic, Inc. Series DC1, June 1962.

(3) Digital Computer and Control Engineering by Robert Steven Ledley, McGraw-Hill Book Company, Inc., 1960, chapters 15 and 17.

(4) Pulsed Linear Networks by Ernest Frank, McGraw-Hill Book Company, Inc., 1945, pages 59–61.

Figure 2:
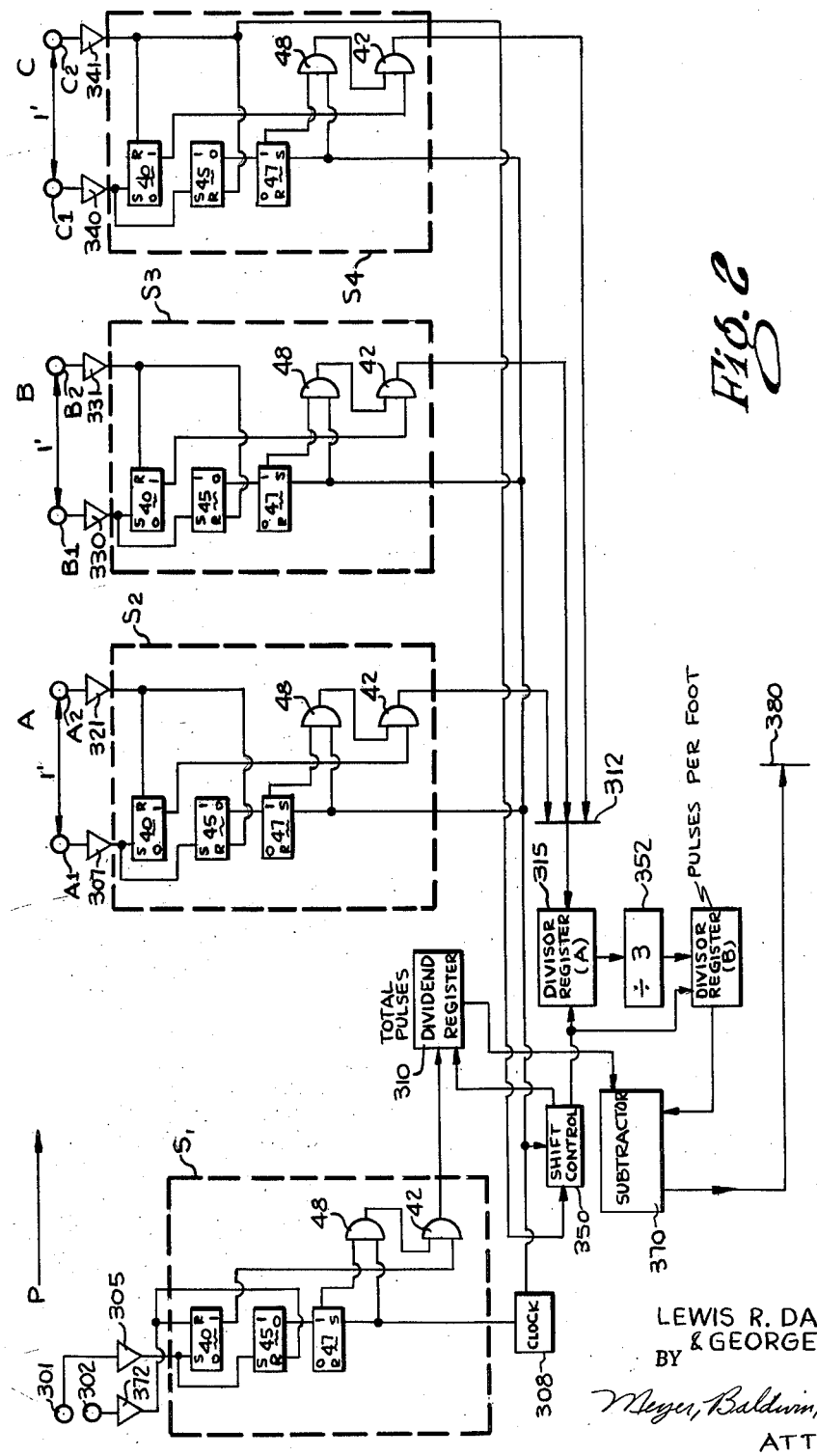
FIG. 2 is a schematic diagram of a second embodiment of measuring system embodying the present invention.

In FIG. 2, another embodiment of measuring system is herein shown and which differs from the previous embodiment in that the exact overall dimension (length) of the article along the direction of conveyance is determined in a single ratio computation.

Specifically, the present system includes a pair of detectors 301 and 302 similar to detectors "a" and "b" in the FIG. 1 embodiment which are located at the input end of the path P along which the article is conveyed.

Detector 301 is actuated by the leading end of the article as it moves along said path and provides a corresponding signal to an amplifier 305, the latter, in turn signaling a suitable "synch circuit" connected thereto which circuit may, for example, be similar to the synch circuit utilized in the FIG. 1 embodiment comprising flip-flops 40, 45, 47 and serially connected AND gates 42 and 48, being identified herein in its entirety by the reference character $S_1$.

Synch circuit $S_1$ synchronizes the start of a clock pulse count from clock pulse source 308 with the actuation of the detector 301, and applies said pulse count through the synch output—AND gates 42—to a suitable binary shift register counter 310 (Dividend) similar to counter 64 wherein an accumulation of a pulse count is initiated, said pulse count being referred to herein as the binary dividend pulse count information.

Spaced along the conveyance path P are a plurality of pairs of detectors, the instant system disclosure merely using three pairs of detectors as identified at A, B and C, but as will hereinafter be apparent any number of pairs of detectors may be utilized.

The detectors in each detector pair A, B and C are spaced exactly one foot apart, each pair being likewise located at any desired spaced interval along the path. Each detector of each pair is also of the type actuated by the leading end of the article.

With hte dividend pulse count initiated by detector 301, and accumulating in Dividend register 310 and the article continuing to move along the conveyance path P, its leading end passes and actuates detector $A_1$ of the first detector pair being effective to initiate a Divisor pulse count.

Detector $A_1$ has its output connected to amplifier 307 wherein its output signal is amplified and applied to a suitable "synch circuit" which, merely for simplicity is herein likewise shown as having the same configuration of synch circuit heretofore utilized, and which is identified in its entirety by the reference character $S_2$.

The clock 308 is seen to be connected to the output AND gates 48 and 42 of said synch circuit and from gate 42 to an OR gate 312.

The output of OR gate 312 is connected in turn serially to the input of a conventional binary shift register counter 315 (Divisor Register A) similar to counter 50 wherein the clock pulses from clock 308 are received and accumulated, said clock pulses being hereinafter defined as Divisor Pulse Group I.

As the article continues to move along the path P, its leading end actuates the detector $A_2$ of detector pair A which, as aforementioned, is spaced exactly one foot from detector $A_1$ and which, in turn, provides a signal to its amplifier 321.

The output of amplifier 321 is connected to the flip flops 40 and 45 of the synch circuit $S_2$, and is effective to reset the same to thereby stop the accumulation of clock pulses defining the Divisor Pulse Group I.

Inasmuch as the detectors $A_1$ and $A_2$ of detector pair A are spaced exactly one foot apart, the number of pulse counts which define Divisor Pulse Group I represents in binary pulse information exactly one foot of the length of the article.

As the article continues along the path P, its leading end next successively actuates the detectors $B_1$ and $B_2$ of the detector pair B, and detectors $C_1$ and $C_2$ of the detector pair C, provided that the trailing end of the article does not actuate detector 302.

Upon actuation of detectors $B_1$ and $B_2$, the amplifiers connected thereto as indicated at 330 and 331, respectively, provide through the associated synch circuit $S_3$ the initiation and accumulation in Divisor Register A of a pulse count from clock 308 identified as the Divisor Pulse Group II.

In like manner, the actuation of detectors $C_1$ and $C_2$ by the leading end of the article and the resultant actuation of synch circuit $S_4$ through amplifiers 340, 341 provides the initiation and accumulation of a third pulse count in Divisor Register A defined herein as Divisor Pulse Group III.

As will be realized the number of pulses accumulated in each Divisor pulse group is a function of the speed of the article moving along the path P. For example, if the article speed is increased as it actuates detector pair B, the number of clock pulses in Divisor Group II will be proportionately less than the pulse number in Group I.

Likewise, if the speed of the article is at a relatively lower magnitude as it actuates detector pair C, the number of clock pulses in Divisor Group III will be proportionately greater than the number of pulses in Groups I and II.

Whereas, it will also be understood that if the speed of the article remains constant, the number of pulses in each Divisor group will be the same.

When the leading end of the article actuates detector $C_2$ it also provides a signal through amplifier 341 to a shift control 350 of conventional design similar to shift control 51 whereby said shift control signals the Divisor Register A 315 to apply the total number of accumulated clock pulses of Groups I, II and III to the input of a conventional "divide by three" circuit as indicated at 352 wherein said accumulated clock pulses are divided by three to give an average number of clock pulses per foot of length of the article, which average pulse count is hereinafter referred to as the Divisor pulse count (average) information which is applied to a conventional Divisor Register B which is also similar to Register Counter 50.

The Control Unit 350 likewise signals the Divisor Register B to apply the Divisor count (average) to the input of a Subtractor Logic Unit 370 which is likewise of conventional design such as of the type disclosed in the aforementioned literature.

When the trailing end of the article passes and actuates detector 302, a signal from its amplifier 372 resets flip-flops 40 and 45 of synch circuit $S_1$ which, in turn, inhibits AND gates 48 and 42 to thus stop the accumulation of dividend clock pulse information from clock 308.

When this occurs, the Shift Control 350 signals the Dividend Register 315 to apply the accumulated Dividend clock pulse information to the Subtractor Unit 370.

As will be realized, inasmuch as detectors 301 and 302 are located at the same position along the path P, the total number of clock pulses defining the Dividend clock pulse information is a function of the length of the article and likewise of the speed of conveyance of said article.

In like manner, since the detectors of each detector pair A, B and C are spaced exactly one foot apart, the number of clock pulses defining the Divisor clock pulse information (average) is also a function of the speed of conveyance. However, since the dividend and divisor pulse information originates at the same constant source (clock 308), the change in speed of conveyance of the article affects both dividend and divisor pulse count information in the same manner, and consequently any change in conveyance speed will have but slight effect, if any at all, on the accuracy of pulse count accumulation.

When the dividend clock pulse information is applied to the Subtractor Unit 370, it is divided by the Divisor clock pulse information (average) by binary subtraction to thereby result in a ratio computation of the exact total length of the article or, in other words, the total Dividend information (Q pulses) is divided by the Divisor information (average) (Q pulses/foot) thereby providing a binary quotient which represents the exact overall length of the article.

This binary quotient information is then serially applied through OR gate 380 to a conventional Totalizer Unit such as is utilized in the previous embodiments wherein it is decoded into its decimal equivalent.

Figure 3:
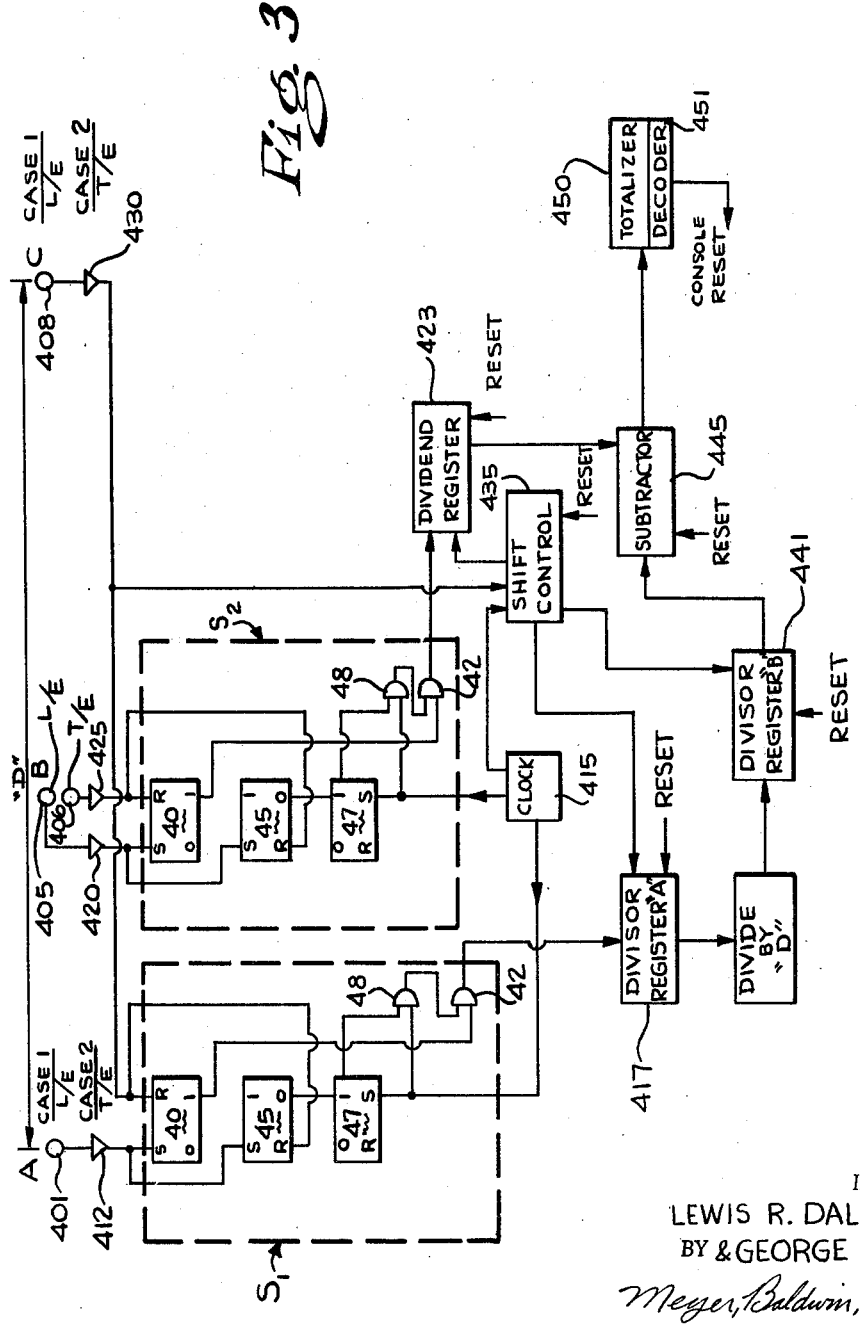
FIG. 3 is a schematic diagram of a third embodiment.

In FIG. 3 another embodiment of measuring system is herein disclosed as basically a three station system, as is defined at positions A, B and C.

A suitable detector 401 is seen to be disposed at position A along the conveyance path P and, as will later appear, said detector may be actuatable by the leading or trailing end of the article as it passes said position A.

A pair of suitable detectors 405, 406 are disposed at position B spaced from position A along said path, and a single detector 408 is likewise seen to be located at position C which is spaced at a suitable distance from position B along said path.

As will likewise later appear, one of the detectors 405, 406 at position B is a leading end detector, that is to say, it is actuated by the leading end of the article while the other detector is a trailing end detector.

The detector 408 at position C may also be either a leading or trailing end detector, it being required, however, that detectors 401 and 405 each be of the same type, that is, either leading end or trailing end detectors.

The spacing as identified at D between the detectors at positions A and C is a known value in any suitable dimensional quantity.

In the disclosed embodiment, the article is conveyed along the path P from left to right. However, as will later appear, by merely reversing the location of positions A and C, the article may be conveyed in the opposite direction.

Detector 401 at position A is connected to a suitable amplifier 412 and, upon the actuation of said detector by the leading end of the article, said amplifier receives the output signal from said detector and amplifies the same, said amplified signal being connected, in turn, to the input of a synch circuit $S_1$ which, for purpose of the instant disclosure, is shown to have the same circuit configuration as the synch circuit $S_1$ of the FIG. 1 embodiment.

A constant repetitive source of pulse signals as indicated by clock 415 which is similar to clock 32, is connected into the synch circuit $S_1$ and, upon the actuation of detector 401, distinct clock pulses from said clock comprise the output signal from the AND gate 42 output of the synch circuit $S_1$, which output signal is loaded into a conventional binary shift register counter 417 (Divisor) similar to counter 315 wherein an accumulation of a pulse count is initiated, said pulse count being referred to herein as the binary Divisor A pulse count information.

As the article continues its conveyance along the path P to the right, its leading end next actuates detector 405 which is seen to connect to a suitable amplifier 420, the output of said amplifier connecting, in turn, to the input of a synch circuit $S_2$ which is identical to synch circuit $S_1$. The clock 415 is also connected to the output AND gates 48 and 42 of synch circuit $S_2$.

The output of AND gate 42 of said synch circuit is connected to a suitable binary shift register counter as identified at 423 (Dividend Register) similar to counter 310 wherein the clock pulses from said AND gate 42 are accumulated, said clock pulses being hereinafter defined as the binary Dividend pulse count information.

Assuming that the article has a dimension in the direction of its conveyance, that is, less than the distance D between positions A and C, the trailing end of the article will next actuate detector 406 at position B. Detector 406 is seen to be connected to a suitable amplifier 425 wherein the signal output therefrom is amplified and, in turn, applied to the synch circuit $S_2$ effective to reset the same and stop the accumulation of the Dividend pulse count information in Dividend Register 423.

As will be realized, the number of clock pulses in Dividend pulse count information is a function of length of the article and the speed at which the article is conveyed along the path P.

As the article continues along the path P, its leading end next actuates detector 408 at position C.

Detector 408 has its output connected to a suitable amplifier 430 the output of which, in turn, is connected to the synch circuit $S_1$.

As the detector 408 is actuated by the leading end of the article, the resultant amplified signal of amplifier 430 resets synch circuit $S_1$, thereby stopping the accumulation of Divisor A clock pulse information in Divisor Register 417.

As will be realized, the number of clock pulses comprising the Divisor A clock pulse information is a function of the speed of conveyance of the article over the known distance D.

Upon terminating the accumulation of the Divisor A clock pulse information, the instant measuring system performs a ratio computation of the exact dimension of the article taken in the direction of its conveyance.

To accomplish this, the output signal from detector 430 is applied to a suitable Shift Control Unit 435 which is similar to the Unit 51 in the FIG. 1 embodiment, and which signals the Divisor Register 417 to feed its accumulated Divisor A pulse count information into a conventional "divide by D" circuit similar to circuit unit 352 in the FIG. 2 embodiment wherein said pulse count information is divided to provide a Divisor B pulse count information. As will be realized the number of clock pulses representing the Divisor B pulse count information is the average number of clock pulses received from clock 415 per each unit of measurement in distance D, for example, if distance D is in inches or feet, then the Divisor B pulse count is likewise the average number of clock pulses per inch or per foot over the distance D.

The Divisor B pulse count is loaded into a suitable binary shift register counter as identified at 441 (Divisor Register) similar to counter 315 wherein the same may be conveniently stored.

The Shift Control Unit 435 is also connected to Divisor Register 441 and the Dividend Register 423 and is operative to signal said Registers to load their respective accumulated pulse information into a conventional Subtractor Logic Unit 445 similar to Unit 370 wherein the Dividend pulse count information is divided by the Divisor B pulse count information by means of binary division (subtraction) in the same manner as previously described to thereby result in a ratio computation (quotient) of the exact dimension of the article measured in the direction of conveyance of said article.

As in the previous embodiments, the process of binary division is preferably controlled by the clock source 415 so that the pulse signal output from the Subtractor Unit 445 may be serially applied to a suitable binary Totalizer 450 which includes a Decoder Unit 451, said components being similar to Units 35 and 36, respectively, of the FIG. 1 embodiment wherein the pulse information is decoded into its decimal equivalent and thus available for conventional tabulation.

As likewise in the previous embodiments, the Decoder Unit 451 also provides a console signal to each of the Logic Unit Components effective to reset said components so as to condition the same for the next article to be conveyed.

As previously indicated, in the embodiment of measuring system disclosed in FIG. 3, the article is moving along the conveyance path P from left to right.

However, as will now be obvious, by merely reversing the detectors 401 and 408 and their respective circuit connections, the article may be conveyed in the opposite direction or from right to left along said path.

Likewise, as will now be apparent, the instant measuring system is capable of measuring articles having a dimension that is less than, equal to, or greater than, the distance D between detectors 401 and 408.

The detectors 405 and 406 at position B may also be located at or any where between positions A and C.

Figure 4:
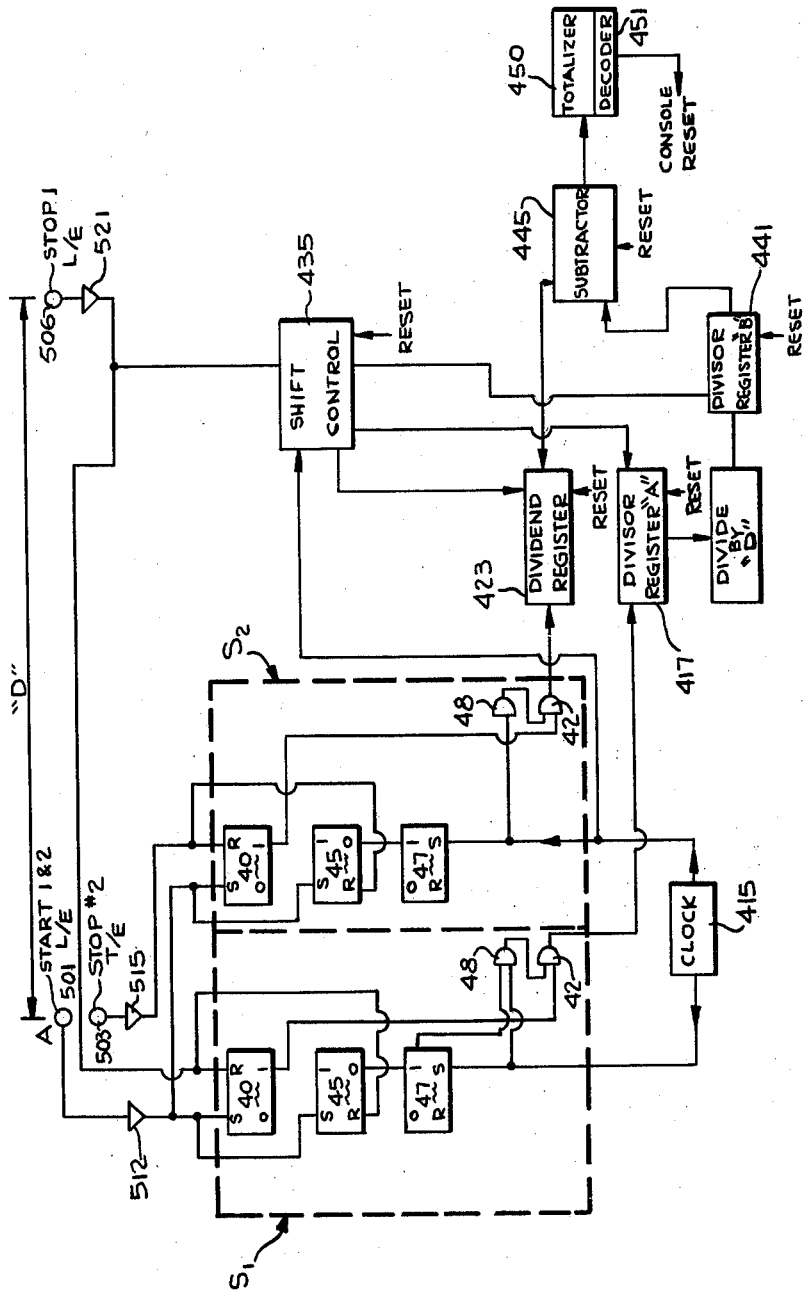
FIG. 4 is a fourth embodiment of measuring system of the present invention.

In FIG. 4 is herein shown the resultant configuration of the measuring system of FIG. 3 where the detectors at position B are moved to position A so as to be coincident with the detector at said position A.

Merely to simplify the detector circuitry in the special configuration of the measuring system of FIG. 4, a single detector 501 is disposed at position A and is intended to initiate the Dividend and Divisor pulse count information, thus taking on the control function of both detectors 401 and 405 of the FIG. 3 measuring system.

A single detector 503 is also disposed at position A and is intended to stop the accumulation of the Dividend pulse count information.

Likewise, a single detector 506 is disposed at position C which is spaced from position A a known distance D along the conveyance path, said detector being operable to stop the accumulation of Divisor pulse count information and to initiate the ratio computation of the measuring system in the same manner as detector 408 in the aforesaid FIG. 3 measuring system.

As seen in FIG. 4, the detector 501 is connected to amplifier 512, said amplifier, in turn, connecting to the input of each synch circuit $S_1$ and $S_2$ effective to set said circuits and initiate the accumulation of a Dividend pulse count in the Dividend Register 423 and a Divisor A pulse count in Divisor Register 417.

As the article continues to move along the conveyance path, its trailing end will next actuate detector 503 provided the article is shorter than the distance D between positions A and C, said detector 503 being connected to amplifier 515 and the synch circuit $S_2$ being thereby effective to reset the latter and terminate the accumulation of the Dividend pulse count information in Dividend Register 423.

The leading end of the article next passes position C on said conveyance path so as to actuate detector 506 which is connected to amplifier 521, and from the latter to the synch circuit $S_1$ being thus effective to terminate the accumulation of the Divisor A pulse count information in Divisor Register 417.

The actuation of detector 506 likewise initiates the ratio computation between the Dividend and Divisor pulse count information in the manner previously described in the FIG. 3 measuring system being thus effective to calculate the exact dimension (length) of the article.

As will also be apparent, if the article happens to be longer than the distance D between positions A and C, the detector 506 at position C will be actuated before the actuation of detector 503 at position A. In this instance, the Shift Control Unit 435 is operable, as will be readily understood, to load the Dividend pulse count information and the Divisor pulse count information into the Subtractor Unit 445 after the Divisor Register 441 is in receipt of the average Divisor pulse count from the Divide by D Unit.

Having thus described several embodiments of measuring system, it will be apparent that the same is susceptible to various modifications, combinations and arrangements of components without departing from the inventive concepts as are defined in the claims.

What is claimed is:

1. Apparatus for measuring the dimension of an article in the direction of its conveyance while it is moving along a conveyance path, comprising separate sensing means located sequentially at first, second and third stations disposed along said path in predetermined spaced relationship to each other, the sensing means at said third station being actuated by the leading end of said article to provide a first signal representative of the length of the portion of the article extending at this instant between said third station and said second station, the sensing means at said first station being actuated by the trailing end of said article and means connected to and responsive to the actuation of said sensing means at said first station to initiate a divisor signal, the sensing means at said third station being actuated by the leading end of said article and means connected to and responsive to the actuation of said sensing means at said third station to initiate a dividend signal, and means connected to the means for initiating the dividend and divisor signals for dividing said dividend signal by said divisor signal to provide a quotient signal which is representative of the length of the portion of the article extending between said first and second sensing means at the instant the sensing means at said third station is actuated to initiate said dividend signal.

2. In apparatus as is defined in claim 1 and which includes means connected to said dividing means and to the sensing means providing said first signal for adding the first signal and said quotient signal.

3. Apparatus for measuring the dimension of an article in the direction of its conveyance while it is moving along a conveyance path, comprising separate sensing means located at sequentially first, second and third stations disposed along said path in predetermined spaced relationship to each other, the sensing means at said third station being actuated by the leading end of said article to provide a first signal representative of the length of the portion of the article extending at this instant between said third station and said second station, the sensing means at said first station being simultaneously actuated by the trailing end of said article and means connected to and responsive to the actuation of said sensing means at said first station to initiate a divisor signal, the sensing means at said third station being simultaneously actuated by the leading end of said article and means connected to and responsive to the actuation of said sensing means at said third station to initiate a dividend signal, and means connected to the means for initiating the dividend and divisor signals for dividing said dividend signal by said divisor signal to provide a quotient signal which is representative of the length of the portion of the article extending between said first and second sensing means at the instant said dividend signal is initiated.

4. Apparatus for measuring the dimension of an article in the direction of its conveyance while it is moving along a conveyance path, comprising separate sensing means located sequentially at first, second and third stations disposed along said path in predetermined spaced relationship to each other, the sensing means at said first station being first actuated by the trailing end of said article and means operatively connected to and responsive to the actuation of said sensing means at said first station to initiate a divisor signal, the sensing means at said third station being next actuated by the leading end of said article to provide a first signal representative of the length of the portion of the article extending at this instant between said third and second stations, means operatively connected to and responsive to the actuation of said sensing means at said third station to initiate a dividend signal, and means connected to the means for initiating the dividend and divisor signals for dividing said dividend signal by said divisor signal to provide a quotient signal which is representative of the length of the portion of the article extending between said first and second sensing means at the instant said dividend signal is initiated.

5. Apparatus for measuring an article as is defined in claim 4 and which includes means connected to said dividing means and to the sensing means providing said first signal for adding said first signal and said quotient signal.

6. Apparatus for measuring the dimension of an article in the direction of its conveyance while it is moving along a conveyance path, comprising separate sensing means located sequentially at first, second, third and fourth stations disposed along said path in predetermined spaced relation to each other, the sensing means at said third station being actuated by the leading end of said article to provide a first signal representative of the portion of the length of the article extending at this instant between said third station and said second station, the sensing means at said first station being next actuated by the trailing end of said article and means connected to and responsive to the actuation of said sensing means at said first station to initiate a divisor signal, the sensing means at said fourth station being next actuated by the leading end of said article and means connected to and responsive to the actuation of said sensing means at said fourth station to initiate a dividend signal, and to provide a second signal representative of the length of the portion of the article then extending between said fourth station and third station, and means connected to the means for initiating the dividend and divisor signals for dividing said dividend signal by said divisor signal to provide a quotient signal which is representative of the length of the portion of the article extending between said first and second stations at the instant the sensing means at said fourth station is actuated.

7. In apparatus for measuring the dimension of an article as is defined in claim 6 and which includes means connected to the means for initiating said first and second signals for accumulating the first and second signals.

8. In apparatus for measuring the dimension of an article as is defined in claim 6 and which includes means connected to the means for initiating the first and second signals and the dividend and divisor signals for accumulating the first and second signals and said quotient signal.

9. Apparatus for measuring the dimension of an article in the direction of its conveyance while it is moving along a conveyance path comprising separate sensing means located sequentially at first, second and third stations disposed along said path in predetermined spaced relationship to each other, the sensing means at said first station being actuated by one end of the article and means connected to said sensing means to initiate a first signal having predetermined characteristics with respect to time, said one end of the article actuating the sensing means at said second station and means connected to said sensing means to initiate a second signal having the same characteristics as said first signal, sensing means at said third station connected to the means for initiating said first signal being actuated by said one end of said article and effective to stop the initiation of said first signal, sensing means at said second station connected to the means for initiating said second signal being actuated by the opposite end of said article to stop the initiation of said second signal, and means connected to the means for initiating said first and second signals for dividing one of said initiated signals by the other of said initiated signals to provide a quotient signal which is representative of the dimension of the article in the direction of its conveyance.

10. Apparatus for measuring the dimension of an article in the direction of its conveyance while it is moving along a conveyance path comprising separate sensing means located sequentially at first and second stations disposed along said path in predetermined spaced relationship to each other; the sensing means at said first station being actuatable by the leading end of said article and means connected to and responsive to the actuation of said sensing means at said first station to initiate first and second signals each having the same characteristics with respect to time, the sensing means at said first station being actuated by the trailing end of said article to stop the initiation of one of said signals, said sensing means at said second station being connected to the means for initiating the other of said signals and actuated by the leading end of the article to stop the initiation of the other of said signals, and means connected to the means for initiating the first and second signals for dividing one of said initiated signals by the other of said initiated signals to provide a quotient signal which is representative of the dimension of the portion of the article along its direction of conveyance.

11. Apparatus for measuring the dimension of an article in the direction of its conveyance while it is moving along a conveyance path, comprising separate sensing means located sequentially at first, second, third and at least one additional station disposed along said path in predetermined spaced relation to each other, the sensing means at said third station being actuated by the leading end of said article to provide a first signal representative of the portion of the length of the article extending at this instant between said third station and said second station, the sensing means at said first station being actuated by the trailing end of said article and means connected to and responsive to the actuation of said sensing means at said first station to initiate a divisor signal, the sensing means at said one additional station being next actuated by the leading end of said article and means responsive to the actuation of said sensing means at said one additional station to initiate a dividend signal, and to provide a second signal representative of the length of the portion of the article then extending between said one additional station and the next additional station upstream therefrom along said conveyance path, and means connected to the means for initiating the dividend and divisor signals for dividing said dividend signal by said divisor signal to provide a quotient signal which is representative of the length of the portion of the article extending between said first and second stations at the instant the sensing means at said one additional station is actuated.

12. In apparatus for measuring the dimensions of an article as is defined in claim 11 and which includes means connected to the means for initiating said first and second signals for accumulating the first and second signals.

13. In apparatus for measuring the dimension of an article as is defined in claim 11 and which includes means connected to the means for initiating the first and second signals and the dividend and divisor signals for accumulating the first and second signals and said quotient signal.

14. Apparatus for measuring the dimension of an article in the direction of its conveyance while it is moving along a conveyance path, comprising separate sensing means located sequentially at first, second and third stations disposed along said path in predetermined spaced relationship to each other, the sensing means at said third station being actuated by the leading end of said article to provide a first signal having predetermined characteristics with respect to time and which is representative of the length of the portion of the article extending at this instant between said third station and said second station, the sensing means at said first station being actuated by the trailing end of said article and means connected to and responsive to the actuation of said sensing means at said first station to initiate a second signal also having predetermined characteristics with respect to time which are mathematically related to the characteristics of said first signal, the sensing means at said third station being also actuated by the leading end of said article and means connected to and responsive to the actuation of said sensing means at said third station to initiate a third signal having predetermined characteristics with respect to time which are mathematically related to the characteristics of said first signal, means connected to the means for initiating said third and second signals for dividing said third signal by said second signal to provide a quotient signal which is representative of the length of the portion of the article extending between said first and second sensing means at the instant the sensing means at said third station is actuated to initiate said third signal, and means for adjusting at least one of said signals so as to vary its time characteristics.

15. Apparatus for measuring the dimension of an article in the direction of its conveyance while it is moving along a conveyance path comprising, means actuated by at least one end of the article for starting and accumulating a first signal which has a magnitude that is representative of the dimension of the article to be measured in the direction of its conveyance, means actuated by an end of said article for generating a second signal which is mathematically divisible into said first signal and which second signal has a value that is representative of a known distance and in a preselected dimensional scale that is travelled by said last mentioned end of said article as it is conveyed in said direction of conveyance and means for dividing the first signal by the second signal to provide a quotient signal in said dimensional scale that is representative of the exact dimension of the article.

16. Apparatus for measuring the dimension of an article in the direction of its conveyance while it is moving along a conveyance path comprising, sensing means located at first and second stations disposed along said path in predetermined spaced relationship to each other, the sensing means at said first station being actuatable by one end of said article and means responsive to the actuation of said sensing means at said first station to initiate first and second signals each having the same characteristics with respect to time, the sensing means at said first station being actuatable by the opposite end of said article to stop the initiation of one of said signals whereby said one signal represents the dimension of said article between its opposite ends in the direction of conveyance, the sensing means at said second station being actuatable by said one end of said article to stop the initiation of the other of said signals whereby said other signal is representative of the distance between said first and second stations, and said one end of said article actuating means for dividing said one signal by said other signal to provide a quotient signal representative of the dimension of the article between its opposite ends along its direction of conveyance.

17. Apparatus for measuring the dimension of an article in the direction of its conveyance while it is moving along a conveyance path comprising, sensing means located at first and second stations disposed along said path in predetermined spaced relationship to each other, the sensing means at said first station being actuatable by one end of said article and means responsive to the actuation of said sensing means at said first station to initiate a first signal having predetermined electrical characteristics with respect to time, the sensing means at said second station being actuated by said one end of said article to stop the initiation of said first signal whereby said first signal has a value representative of the known distance between said first and second stations, the sensing means at one of said stations being actuated by one end of said article to initiate a second signal having the same electrical characteristics as said first signal with respect to time, said last-named sensing means being thereafter actuated by the opposite end of said article to stop the initiation of said second signal whereby said second signal represents the dimension of the article between its opposite ends in the direction of conveyance, and means for dividing said second signal by said first signal to provide a quotient signal which represents the dimension of the article along its path of conveyance.

18. Apparatus for measuring the dimension of an article in the direction of its conveyance while it is moving along a conveyance path comprising sensing means located at first, second, and third stations disposed along said path in predetermined spaced relationship to each other, the sensing means at said first station being actuated by one end of the article to initiate a first signal having predetermined characteristics with respect to time, the sensing means at said second station being actuated by said one end of said article to initiate a second signal having the same characteristics with respect to time as said first signal, sensing means at said third station being actuated by the same end of said article that actuates the sensing means at said first station effective to stop the initiation of said second signal whereby said second signal is representative of the distance between said second and third stations, sensing means at said first station being actuated by the opposite end of said article to stop the initiation of said first signal whereby said first signal represents the dimension of said article between its opposite ends in the direction of conveyance, and said opposite end of said article actuating means for dividing said first signal by said second signal to provide a quotient signal which is representative of the dimension of the article between its opposite ends in the direction of its conveyance.

References Cited by the Examiner
UNITED STATES PATENTS

| | | | |
|---|---|---|---|
| 2,560,124 | 7/51 | Mofenson | 235—92 |
| 2,916,633 | 12/59 | Stone et al. | 250—219 X |
| 2,959,349 | 11/60 | Marsh, et al. | 250—209 X |
| 3,035,478 | 5/62 | Laycak | 209—111.5 X |
| 3,050,685 | 8/62 | Stuart | 235—92 |
| 3,066,226 | 11/62 | Lindstrom | 250—219 X |

RALPH G. NILSON, *Primary Examiner.*

WALTER STOLWEIN, *Examiner.*

UNITED STATES PATENT OFFICE
CERTIFICATE OF CORRECTION

Patent No. 3,159,749                          December 1, 1964

Lewis R. Dalrymple et al.

It is hereby certified that error appears in the above numbered patent requiring correction and that the said Letters Patent should read as corrected below.

Column 5, line 13, for "connected" read -- connects --; column 7, line 5, for '"a'' read -- "a" --; column 9, line 35, for "divided" read -- dividend --; column 10, line 17, for "Brochute" read -- Brochure --; line 61, for "hte" read -- the --; column 13, line 58, for "diivide" read -- divide --; column 15, line 52, for "at sequentially" read -- sequentially at --; column 16, line 27, for "mov-" read -- moving --.

Signed and sealed this 4th day of May 1965.

(SEAL)
Attest:

ERNEST W. SWIDER                            EDWARD J. BRENNER
Attesting Officer                               Commissioner of Patents